United States Patent
Ishimoto et al.

(10) Patent No.: US 6,262,694 B1
(45) Date of Patent: *Jul. 17, 2001

(54) IMAGE DISPLAY SYSTEM

(75) Inventors: Manabu Ishimoto; Satoshi Iwata; Takahiro Matsuda; Hirokazu Aritake; Masato Nakashima, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,599

(22) Filed: Oct. 22, 1997

(30) Foreign Application Priority Data

Mar. 11, 1997 (JP) ................................... 9-056386

(51) Int. Cl.[7] ............................................. G09G 5/00
(52) U.S. Cl. ........................... 345/1; 345/4; 345/5; 345/9
(58) Field of Search .................. 348/39, 51, 52, 348/139, 140; 345/1–7, 8, 9, 420, 421, 426

(56) References Cited

U.S. PATENT DOCUMENTS

| | | | |
|---|---|---|---|
| 4,190,856 | | 2/1980 | Ricks ................................. 358/88 |
| 5,086,354 | | 2/1992 | Bass et al. ........................ 359/465 |
| 5,105,183 | * | 4/1992 | Beckman ........................... 358/108 |
| 5,457,325 | * | 10/1995 | Huberty ............................. 348/139 |
| 5,479,185 | * | 12/1995 | Biverot .............................. 345/6 |
| 5,757,954 | * | 5/1998 | Kuan et al. ........................ 356/39 |
| 5,781,229 | * | 7/1998 | Zeddiker et al. .................. 348/51 |
| 5,784,064 | * | 7/1998 | Penna ................................ 345/422 |
| 5,790,086 | * | 8/1998 | Zelitt ................................. 345/6 |
| 5,805,117 | * | 9/1998 | Mazurek et al. .................. 345/1 |
| 5,822,117 | * | 10/1998 | Kleinberger ....................... 348/51 |
| 5,886,675 | * | 3/1999 | Aye et al. .......................... 345/7 |

FOREIGN PATENT DOCUMENTS

| | | |
|---|---|---|
| 43 00 246 A1 | 7/1993 | (DE) . |
| 2 672 297 A | 8/1992 | (FR) . |
| WO 91/15930 | 10/1991 | (WO) . |
| WO 96/27992 | 9/1996 | (WO) . |

OTHER PUBLICATIONS

Television Society Magazine 31–8, pp. 649–655, 1977.
European Search Report, Nov. 2, 2000.

* cited by examiner

*Primary Examiner*—Vijay Shankar
(74) *Attorney, Agent, or Firm*—Armstrong Westerman Hattori McLeland & Naughton, LLP

(57) ABSTRACT

An image display system includes an image dividing unit for dividing an input image into a plurality of images based on varying distances from an image pickup position, and a plurality of display units, successively arranged at different distances from an observation position, for displaying the plurality of images divided in the image dividing unit, where the plurality of images divided in the image dividing unit are displayed on corresponding display units of the plurality of display units corresponding to the distances from the image pickup position.

21 Claims, 11 Drawing Sheets

| No. | DISTANCE (m) | IMAGE INTERVAL (m) |
|---|---|---|
| 1 | 30 | 2.30 |
| 2 | 32.3 | 2.71 |
| 3 | 35.01 | 3.23 |
| 4 | 38.24 | 3.92 |
| 5 | 42.16 | 4.85 |
| 6 | 47.01 | 6.15 |
| 7 | 53.16 | 8.06 |
| 8 | 61.22 | 10.97 |
| 9 | 72.19 | 15.75 |
| 10 | 87.94 | 24.26 |
| 11 | 112.2 | 41.36 |

| No. | RESOLUTION (Z DIRECTION x X DIRECTION) |
|---|---|
| 1 | 229 x 11459 |
| 2 | 213 x 10643 |
| 3 | 196 x 9819 |
| 4 | 180 x 8990 |
| 5 | 163 x 8154 |
| 6 | 146 x 7313 |
| 7 | 129 x 6467 |
| 8 | 112 x 5615 |
| 9 | 95 x 4762 |
| 10 | 78 x 3909 |
| 11 | 61 x 3064 |

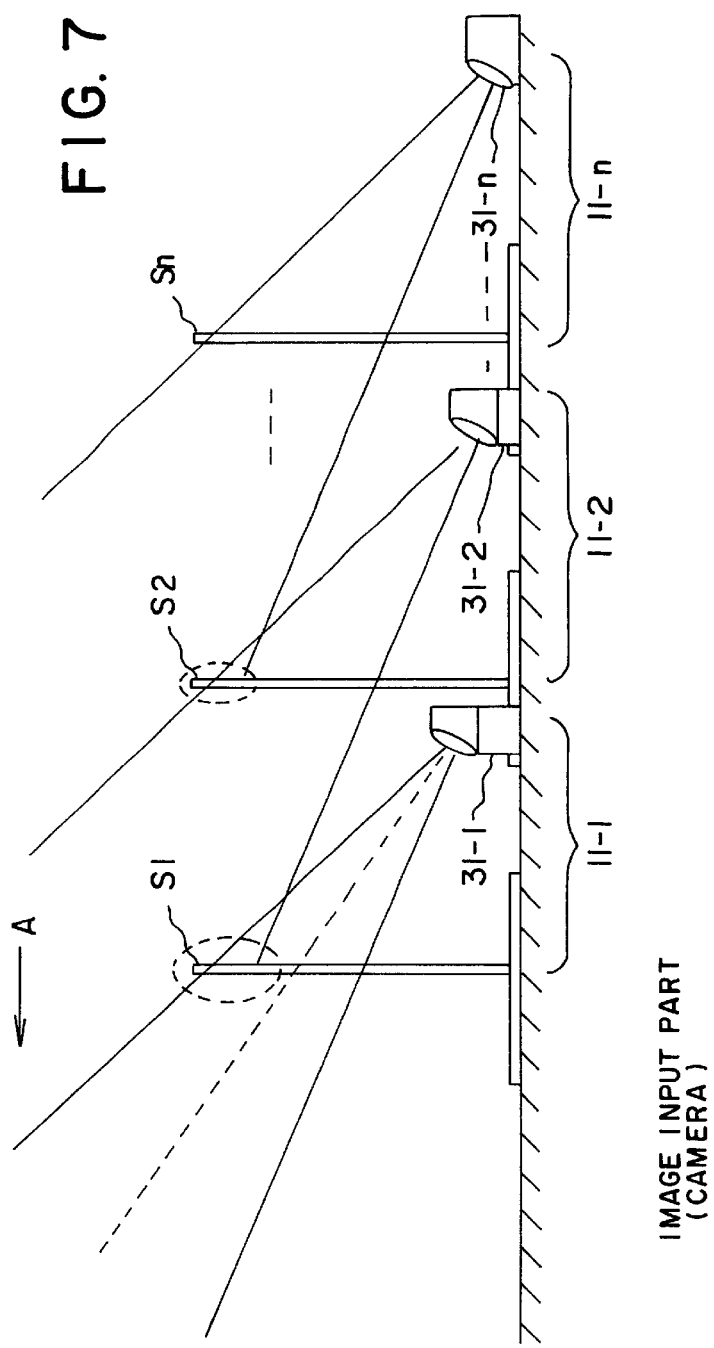
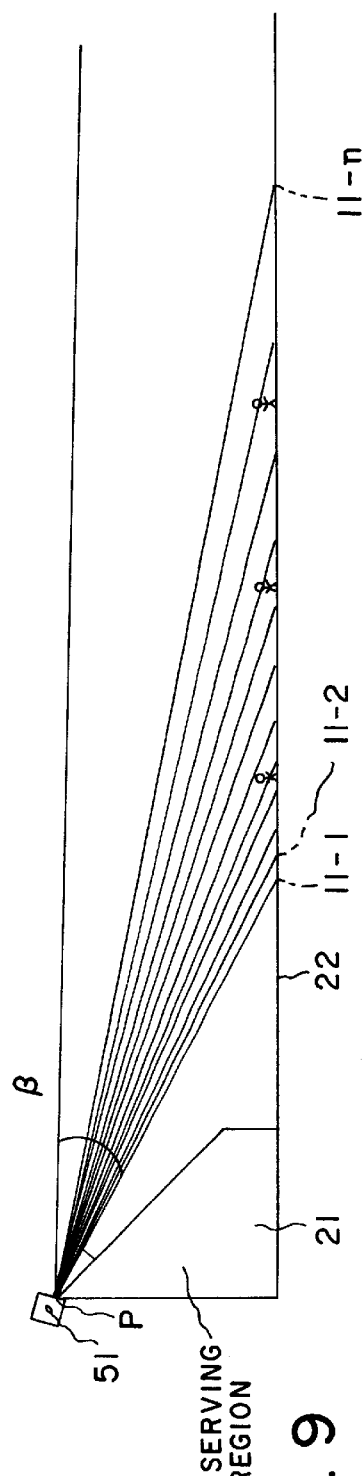

FIG. 14

| No. | DISTANCE (m) | PARALLAX |
|---|---|---|
| 1 | 30 | 0.67 |
| 2 | 32.3 | 0.55 |
| 3 | 35.01 | 0.43 |
| 4 | 38.24 | 0.31 |
| 5 | 42.16 | 0.19 |
| 6 | 47.01 | 0.06 |
| 7 | 53.16 | −0.06 |
| 8 | 61.22 | −0.18 |
| 9 | 72.19 | −0.31 |
| 10 | 87.94 | −0.43 |
| 11 | 112.2 | −0.55 |

REDUCTION RATIO 1/2000 TIMES
STEREO BASE 20 m
STANDARD DISTANCE 50 m

IMAGE DISPLAY SYSTEM

BACKGROUND OF THE INVENTION

1. Field of the Invention

The present invention generally relates to image display systems, and more particularly to an image display system which can display an image on a large screen in a three-dimensional manner.

Recently, systems have been proposed which can provide images with real life presence by displaying images in a three-dimensional manner. Such three-dimensional image display systems are used in amusement parks or the like, and provide images with real life presence to a large number of observers.

In this type of three-dimensional image display system, images are superimposed on the actual object to realize the effect of real life presence with respect to the large number of observers.

There are demands to provide images with real life presence by using the three-dimensional image display system described above in concert halls and stadiums, so as to display three-dimensional images of events performed in another concert hall or stadium. Because the field of view is wide and the set up conditions of equipments are limited in the concert hall or stadium, there are demands to realize a system which can provide a sufficient real life presence using a relatively simple construction.

2. Description of the Related Art

The IMAX dome theater is an example of the conventional three-dimensional image display system of the type described above. According to this three-dimensional image display system, images observed from a plurality of directions are subjected to polarization display on a large screen. The displayed three-dimensional image is viewed by each viewer who wears equipment such as polarization glasses.

On the other hand, a three-dimensional image display system has been proposed which arranges a lenticular lens or the like on the surface of a two-dimensional display. According to this three-dimensional image display system, a three-dimensional image is displayed by changing the emission direction for each of the images from a plurality of directions.

However, according to the conventional three-dimensional image display system which displays the three-dimensional image on the large screen, each viewer must wear special equipment to see the three-dimensional image, and there were problems in that the arrangement is complex and it is troublesome for the viewers to wear the special equipment.

On the other hand, according to the conventional three-dimensional image display system which arranges the lenticular lens on the two-dimensional display, a large two-dimensional display and a large lenticular lens are required if a large screen is to be realized. As a result, there were problems in that the system is expensive and unsuited for large display systems.

SUMMARY OF THE INVENTION

Accordingly, it is an object of the present invention to provide an image display system which does not require the viewer to wear special equipment such as polarization glasses in order to see three-dimensional images, and which can display the three-dimensional images on a large screen using display units having a relatively simple construction.

FIG. 1 is a block diagram for explaining an operating principle of the present invention. In FIG. 1, an image dividing means 1 divides an input image into a plurality of images depending on distances from an image pickup position. Display means 2-1 through 2-n are successively arranged at different distances from an observation position. The display means 2-1 to 2-n display the plurality of images divided by the image dividing means 1. In the present invention, the plurality of images divided in the image dividing means 1 are displayed on corresponding display means 2-x of the plurality of display means 2-1 through 2-n corresponding to the distances from the image pickup position.

According to the present invention, from the input image, the image existing nearby is displayed on the display means arranged near the observer, and the image existing far away is displayed on the display means arranged far away from the observer. For this reason, the observer can recognize the images displayed on the plurality of display means as a three-dimensional image.

Adjacent display means of the plurality of display means are set at intervals proportional to distances from the observation position. The depth perception of the human eyes becomes poorer as the distance from the observation point becomes longer. Hence, the intervals between adjacent display means may be set proportional to the distances from the observation position, so that it is possible to reduce the number of display means without deteriorating the depth perception and to simplify the system structure.

The plurality of display means are set at intervals proportional to squares of the distances from the observation position. The plurality of display means are set at intervals matching the depth perception of the human eyes, by arranging the plurality of display means at the intervals proportional to the squares of the distances from the observation position. For this reason, it is possible to reduce the number of display means without deteriorating the depth perception and to simplify the system structure.

The plurality of display means are set with pixel pitches proportional to the distances from the observation position. The resolving power to the human eyes becomes poorer as the distance from the observation position becomes longer, and thus, the displayed images do not become unnatural to the human eyes even if the pixel pitches of the display means located far away from the observation position is set coarse. Hence, it is possible to provide a natural display to the observer and to simplify the system structure, by setting the pixel pitches of the plurality of display means proportional to the distances from the observation position.

The plurality of display means include a projector projecting the plurality of images, and diffusing means for diffusing light output from the projector. Since the images projected from the projector are output to the diffusing means to be displayed thereon, it is possible to form a large screen using a relatively simple construction, and the system structure can be simplified.

The diffusing means includes transmitting and diffusing means which can switch between diffusing and transmitting states, and switch control means for successively switching the transmitting and diffusing means to the diffusing state. Since the diffusing means includes the transmitting and diffusing means which switches between the diffusing and transmitting states, and the switch control means successively switches the transmitting and diffusing means to the diffusing state, it is possible for the observer to positively recognize the overlapping image portions even when the displayed images overlap between adjacent diffusing means. As a result, it is possible to display the images with a real life presence effect across the plurality of display means.

The switch control means successively switches to the diffusing state within a predetermined number of consecutive display means having display images which do not overlap when an observation is made from the observation position. It is possible to increase the number of display means which simultaneously assume the diffusing state, by successively switching to the diffusing state within the predetermined number of consecutive display means having display images which do not overlap when the observation is made from the observation position. For this reason, it is possible to reduce the number of images which are not displayed, and to display the images with a real life presence effect.

The projector is set so that luminances of image portions overlapping with other display means are higher than luminances of image portions which do not overlap. No difference is introduced between the luminance of the image portion overlapping with the other display means and the luminance of the image portion not overlapping with the other display means, because the luminances of the image portions overlapping with the other display means are set higher than the luminances of the image portions which do not overlap. For this reason, it is possible to display images which appear natural to the observer across the plurality of display means.

The image dividing means divides the input image into ranges of distance corresponding to the display positions of the plurality of display means at the varying placement intervals between adjacent display means. It is possible to simply obtain the images to be displayed on the plurality of display means by successively dividing the input image into ranges of distance corresponding to the display position of the plurality of display means at the varying placement intervals between adjacent display means.

The present invention also includes first image input means for picking up an image; second image input means arranged at a predetermined interval to the first image input means for picking up the image; and parallax detection means for detecting parallax from one of the image picked up by the first image input means and the image picked up by the second image input means, where the image dividing means divides the input image into a plurality of images depending on the parallax detected by the parallax detection means. The images are detected by the first and second image input means, the parallax is detected from the two input images, and the display means for making the display are divided depending on the detected parallax. As a result, it is possible to accurately set the display positions of the images, and to display images which appear natural to the observer.

BRIEF DESCRIPTION OF THE DRAWINGS

These and other objects and advantages of the invention will become apparent and more readily appreciated from the following description of the preferred embodiment, taken in conjunction with the accompanying drawings of which:

FIG. 7 is a diagram showing a construction of the display units corresponding to the image display system of FIG. 2;

FIG. 9 is a diagram explaining an image pickup used for the image display system of FIG. 2;

FIG. 14 is a diagram showing a relationship of the parallax with respect to an image pickup distance in the image pickup system of FIG. 11;

DETAILED DESCRIPTION OF THE PREFERRED EMBODIMENTS

Reference will now be made in detail to the preferred embodiments of the present invention, examples of which are illustrated in the accompanying drawings FIGS. 1 to 16.

Figures 1, 2:
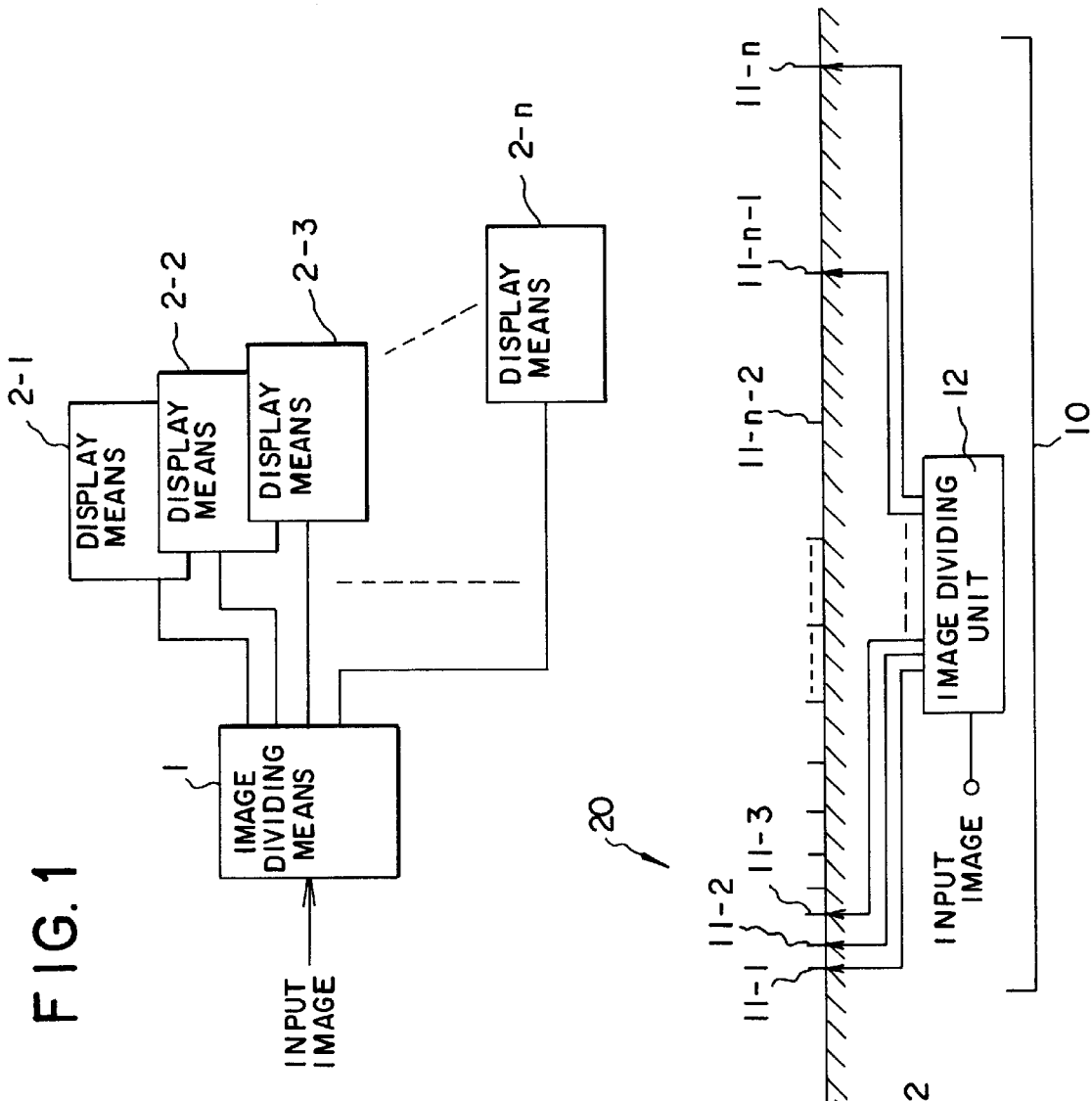
FIG. 1 is a block diagram explaining an operating principle of the present invention.
FIG. 2 is a diagram showing a general construction of an image display system according to a preferred embodiment of the present invention.

FIG. 2 is a diagram showing a general construction of an image display system according to a preferred embodiment of the present invention. In this embodiment, an image display system 10 is set up in a stadium 20. In FIG. 2, display units 11-1 through 11-n are examples of a plurality of display means according to the present invention. The display units 11-1 through 11-n have a generally rectangular shape, and are arranged in a field 22 of the stadium 20 so that a longitudinal direction of each display unit is parallel to a main stand 21 of the stadium 20.

The display unit 11-1 is arranged at a position closest to the main stand 21. The display unit 11-n is arranged at a position farthest away from the main stand 21. The display units 11-2 through 11n-1 are arranged between the display units 11-1 and 11-n so that intervals between two adjacent display units become shorter towards the main stand 21.

An image dividing unit 12 is an example of an image dividing means according to the present invention. This image dividing unit 12 divides a input image into rectangular images depending on distances from an image pickup position. The display units 11-1 through 11-n display the divided images from the image dividing unit 12.

Figure 3A:
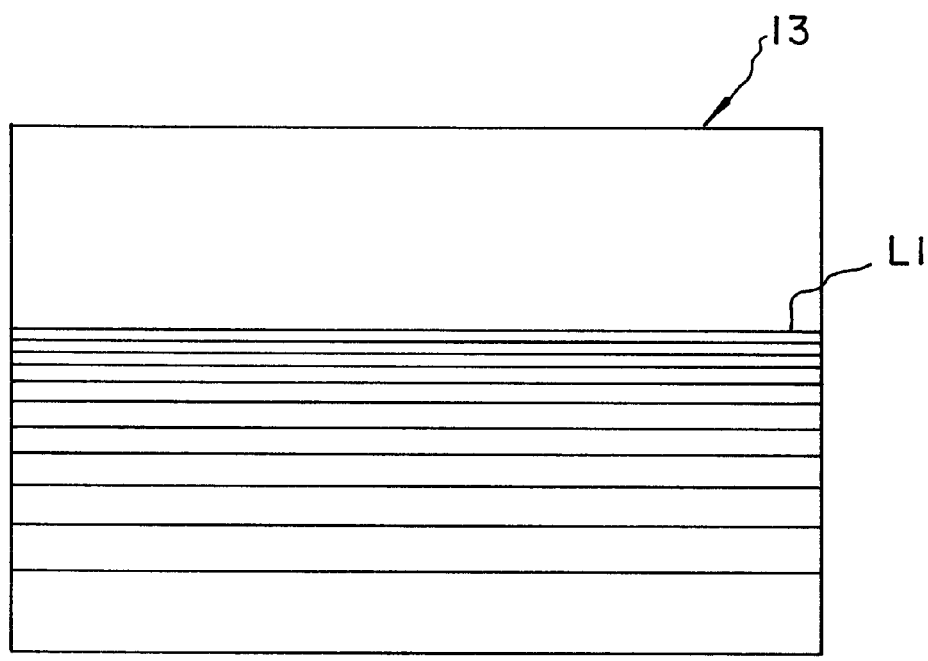
FIG. 3 is a diagram explaining an operation of an image dividing unit corresponding to the image display system of FIG. 2.
Figure 3B:
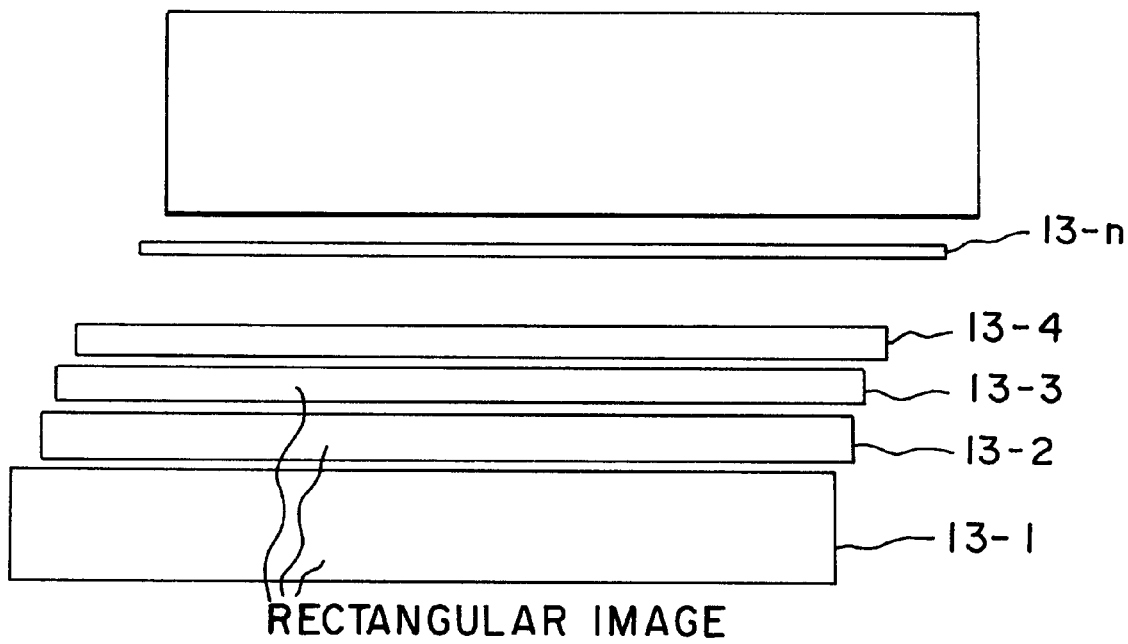

FIG. 3 is a diagram for explaining an operation of the image dividing unit 12. FIG. 3(A) shows an input image. FIG. 3(B) shows divided images. For example, the input image is obtained by picking up the image of the entire field 22 from the main stand 21. A region from the bottom edge of the input image up to a boundary line L1 slightly above the central portion of the input image in FIG. 3(A) corresponds to the image of the field 22. A region above the boundary line L1 corresponds to a background image such as a back (outfield) stand.

An input image 13 shown in FIG. 3(A), for example, is supplied to the image dividing unit 12. The image dividing unit 12 divides the input image 13 shown in FIG. 3(A) in the region between the bottom edge and the boundary line L1 of the input image 13 into a plurality of rectangular images 13-1 through 13-n shown in FIG. 3(B) corresponding to the positions where the display units 11-1 through 11-n are arranged.

The plurality of images 13-1 through 13-n, divided by the image dividing unit 12, are supplied to the display units 11-1 through 11-n such that the image 13-1 is supplied to the display unit 11-1, the image 13-2 is supplied to the display unit 11-2, the image 13-3 is supplied to the display unit 11-3 . . . and the image 13-n is supplied to the display unit 11-n. The display unit 11-1 displays the image 13-1 supplied from the image dividing unit 12, the display unit 11-2 displays the image 13-2 supplied from the image dividing unit 12, the display unit 11-3 displays the image 13-3 supplied from the image dividing unit 12, . . . , and the display unit 11-n displays the image 13-n supplied from the image dividing unit 12.

Next, a description will be given of the reasons why the image can be displayed in a three-dimensional manner by the above described display system.

When watching a game such as baseball and soccer in the stadium 20, a region which is mainly viewed by the observer has a size of approximately 100 m in width, 70 m in depth and 2 m in height in the case where a soccer game is viewed from the main stand 21. To the human eyes, this region which is mainly viewed by the observer is approximately a plane. For this reason, it is sufficient to make the display in a range of approximately 100 m in width, 70 m in depth and 2 m in height.

In addition, a sufficiently long distance exists between the main stand 21 and the field 22 where the players play the game, and a viewing distance from the observer to the field 22 is sufficiently long. Hence, the sensitivity of the three-dimensional perception by the parallax of the observer's eyes becomes extremely poor compared to that of the every day life.

Figures 4, 5:
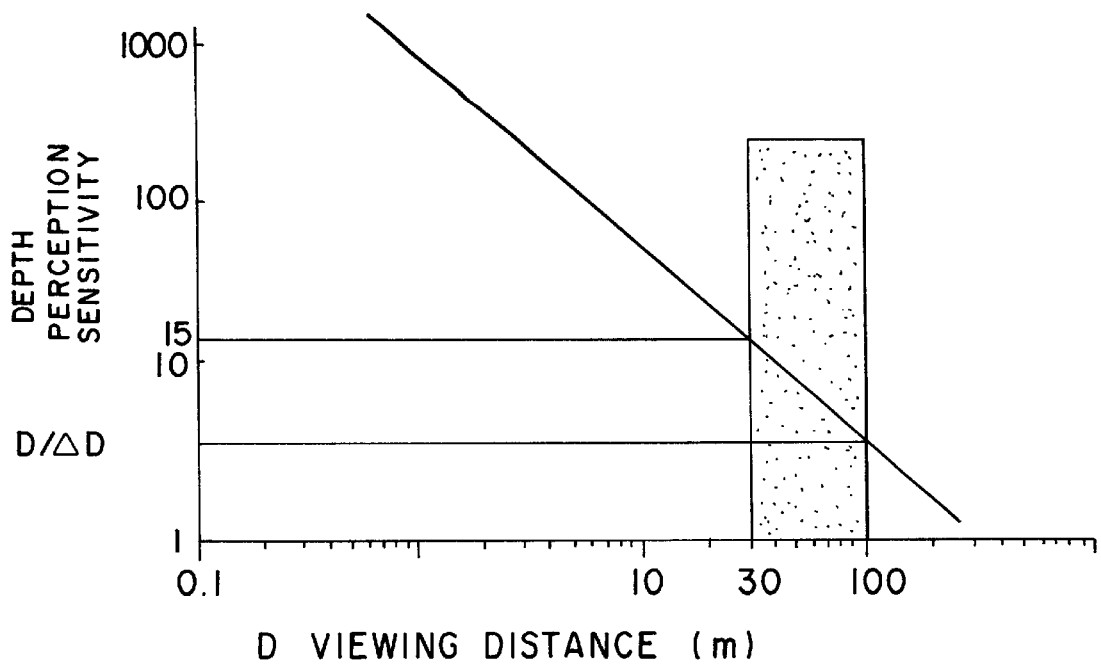
FIG. 4 is a graph showing a characteristic of human eyes between depth perception sensitivity versus viewing distance.
FIG. 5 is a diagram showing a relationship of the image intervals with respect to the viewing distance in the image display system of FIG. 2.

FIG. 4 is a graph showing a characteristic of human eyes between depth perception sensitivity versus viewing distance. In FIG. 4, the abscissa indicates a viewing distance D, and the ordinate indicates a depth perception sensitivity D/ΔD. The viewing distance D is the distance from the observation position, and the depth perception sensitivity D/ΔD indicates the depth which is recognizable by the parallax of the human eyes.

FIG. 4 is also described in Television Society Magazine 31-8, pp. 649–655, 1977.

It may be seen from FIG. 4 that the depth recognizable by the parallax of the eyes changes depending on the viewing distance D. If the viewing distance is 30 m, for example, a minimum value of the depth recognizable by the human eyes is approximately 2 m. In other words, when the viewing distance is 30 m, the depth of an object existing within a range of 30 m+2 m cannot be recognized.

The distance of 2 m, for which the depth cannot be recognized, essentially includes the height of people. For this reason, the depth perception by the parallax of the eyes does not exist with respect to an object having a size which is approximately the same as a man. Accordingly, when the observer watches the game in the stadium or the like where the viewing distance is long, the observer recognizes the image three-dimensionally, not by the depth perception by the parallax of the eyes, but mainly based on depth information which is obtained from the overlap of images (concealing effect) in front and in the rear with respect to the observing position and from the apparent size. In addition, it is known that in general, the real life effect of an image is closely related to the depth of the field of view. Hence, in this embodiment, the plurality of display units 11-1 through 11-n are arranged in the field 22 depending on the depth, and the depth information is provided to the observer so as to enable three-dimensional recognition of the image, by directly displaying the players and the like and making the overlap of the images (concealing effect) and the apparent size different depending on the depth.

Since the images are displayed in the field, the observer can recognize the images and the actual stadium. For this reason, the observer can watch the game with a field of view identical to the actual field of view, and a high real life presence effect can be obtained. Although the images displayed on the display units 11-1 through 11-n are two-dimensional images, the observation position and the display positions are separated by sufficiently long distances, and the depth perception by the parallax of the eyes is difficult at such long distances. Consequently, it is possible to obtain a three-dimensional feel which is approximately the same as that obtained by actually watching the game, even though no three-dimensional image is displayed.

Furthermore, the field itself which becomes the background is the actual field, and the relative relationship between the field and the image positions can be maintained constant. Hence, it is possible to greatly improve the three-dimensional feel by displaying the two-dimensional images.

The depth resolving power ΔD with respect to the viewing distance D can be obtained from FIG. 4 as follows, as disclosed in the Television Society Magazine described above, where $A=1.34 \times 10^{-3}$ and $K=2.19$:

$$\Delta D = AD^K \quad (1)$$

If a minimum value of the viewing distance D at which the observer watches the game is 30 m, for example, the depth resolving power ΔD becomes 2.3 m.

FIG. 5 is a diagram showing the relationship of the image intervals with respect to the viewing distance. When the screen is provided at a position where the viewing distance is 30 m as shown in FIG. 5, the depth resolving power ΔD for the viewing distance of 30 m becomes 2.3 m, and the depth cannot be recognized within 2.3 m. Hence, the next screen is provided at a position which is 2.3 m farther away from the 30 m position, that is, at the viewing position which is 32.3 m away, so that the images can be recognized three-dimensionally. Similarly, the depth resolving power ΔD of the screen provided at the 32.3 m position becomes 2.71 m, and the depth cannot be recognized within 2.71 m. Thus, the next screen is provided at a viewing position which is 32.3 m +2.71 m (i.e., 35.01 m) away, so that the images can be recognized three-dimensionally.

In addition, the depth resolving power ΔD of the screen provided at the 35.01 m position becomes 3.23 m, and the depth cannot be recognized within 3.23 m. Thus, the next screen is provided at a position which is 35.01 m+3.23 m (i.e., 38.24 m) away, so that the images can be recognized three-dimensionally. The screens are arranged similarly thereafter. Finally, the depth resolving power ΔD of the screen provided at the 61.22 m position becomes 10.97 m, and the depth cannot be recognized within 10.97 m. Thus, the next screen is provided at a position which is 61.22 m+10.97 m (i.e., 72.19 m) away, so that the images can be recognized three-dimensionally.

As may be seen from FIG. 5, as the viewing distance becomes longer, the depth resolving power ΔD becomes larger and the minimum distance of the recognizable depth becomes longer. For this reason, it is possible to increase the intervals of the display units as the viewing distance becomes longer, and the number of display units can be reduced.

With regard to the resolution in the horizontal direction and the height direction, that is, the resolutions of the display units 11-1 through 11-n, a resolution ΔD is determined so that the following formula stands:

$$\Delta d = D \tan \theta \quad (2)$$

Figures 6, 10:
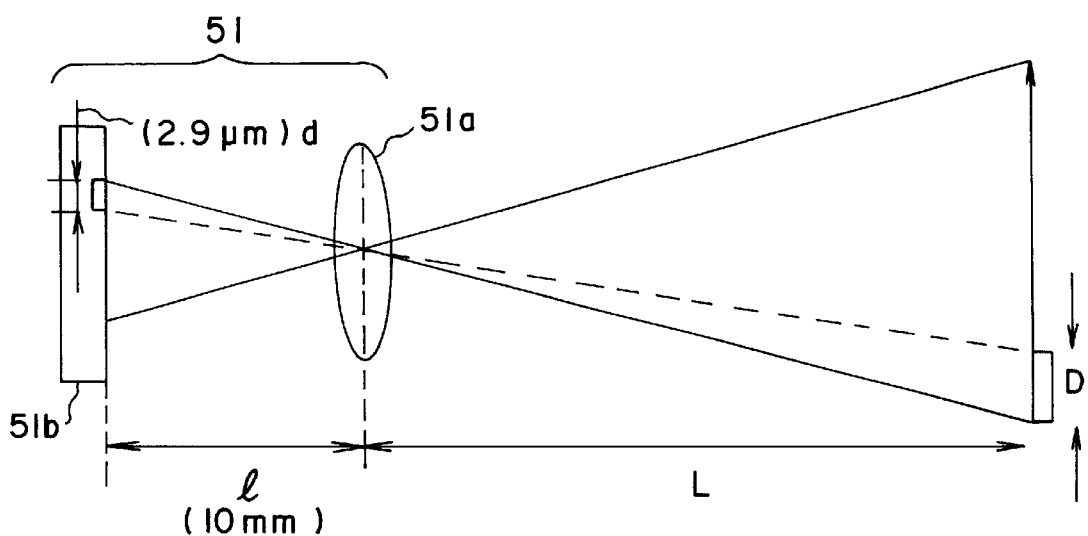
FIG. 6 is a diagram showing resolutions of display units corresponding to the image display system of FIG. 2.
FIG. 10 is a diagram explaining a resolving power of an image input device used for the image display system of FIG. 2.

FIG. 6 is a diagram showing resolutions of the display units corresponding to the image display system of FIG. 2. If it is assumed that the height is 2 m, the width is 100 m, the resolving power of the eyes is 1 minute (corresponds to visual acuity of 1.0), and the resolution Δd is obtained from the formula (2) described above, then the display unit 11-1, which is arranged at the position of D=30 m, must have 229×11459 pixels, as shown in FIG. 6.

Similarly, the display unit 11-2 must have 213×10643 pixels, the display unit 11-3 must have 196×9819 pixels, . . . , the display unit 11-11 must have 61×3064 pixels, . . .

Further, the total number of pixels of the display units 11-1 through 11-11 is approximately 13,200,000 (13.2 M), and is only on the order of approximately 6 times that of HDTV (2,250,000 pixels). Hence, the display can be made by relatively small scale display units even though the display, as a whole, is made on a large scale.

FIG. 7 is a diagram showing a construction of the display units corresponding to the image display system of FIG. 2. Projection type display units are used as the display units 11-1 through 11-n.

When the projection type display units are used for the display units 11-1 through 11-n, the display units 11-1 through 11-n respectively comprise screens S1 through Sn and projection type displays 31-1 through 31-n.

The screens S1 through Sn are arranged in the field 22 according to the image intervals shown in FIG. 5. The projection type displays 31-1 through 31-n are respectively provided at a plurality of positions along the longitudinal directions (directions perpendicular to the paper in FIG. 7) of the screens S1 through Sn, so as to satisfy the resolutions shown in FIG. 6.

According to the display units 11-1 through 11-n having the above described construction, upper end portions of the screens S1 through Sn, which are indicated by phantom lines in FIG. 7, overlap with the screens respectively arranged in front (direction of an arrow A). Hence, lower portions of the images displayed on the screens S2 through Sn which are arranged to the rear of the screen S1 are respectively blocked by top portions of the screens S1 through Sn-1 arranged in front of the screens S2 through Sn, and these lower portions cannot be recognized by the observer in the main stand 21. For this reason, it is conceivable to use transmitting and blocking screens for the screens S1 through Sn, so as to make all of the images recognizable.

Figure 8:
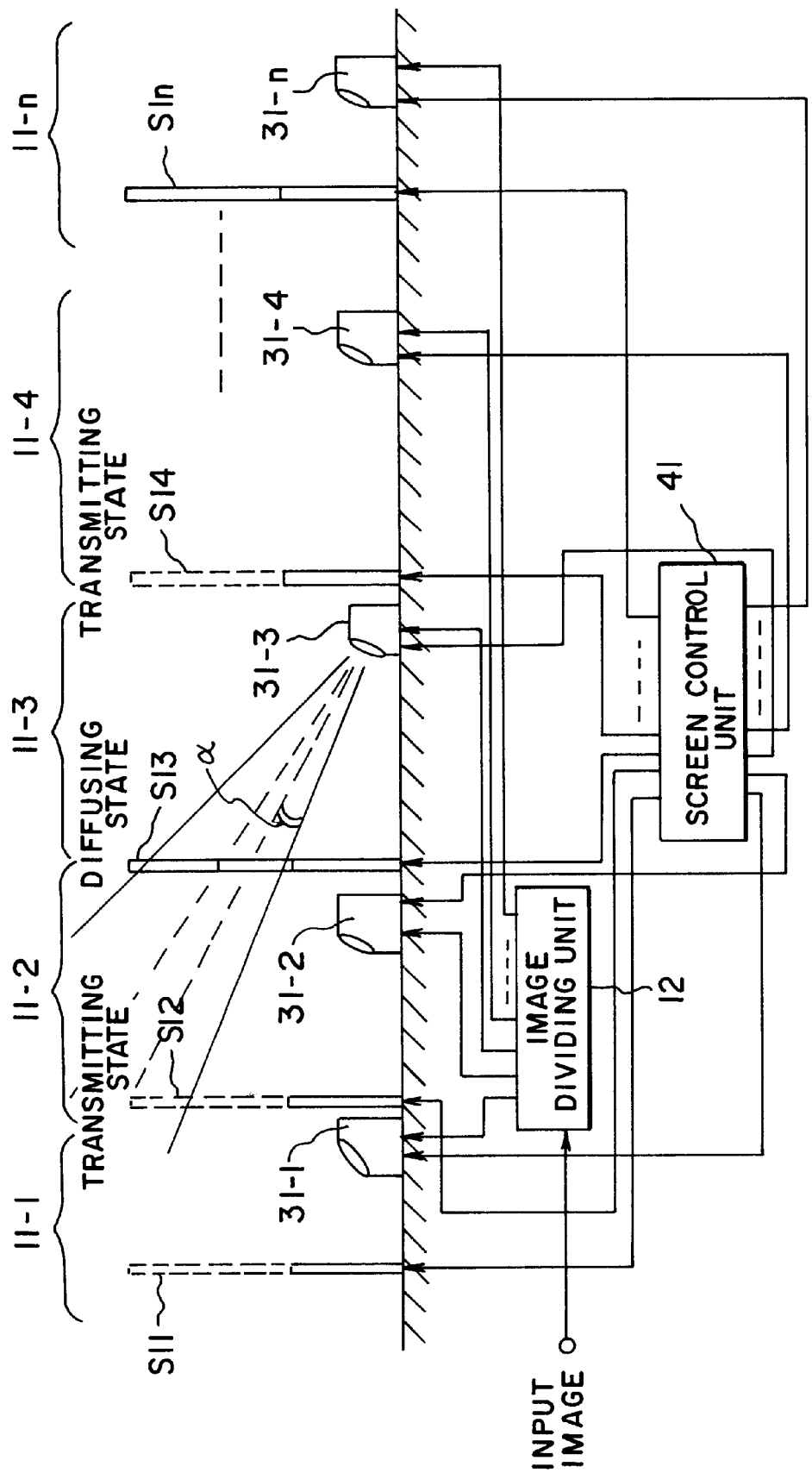
FIG. 8 is a diagram showing a construction of modified display units used for the image display system of FIG. 2.

FIG. 8 is a diagram showing a construction of modified display units used for the image display system of FIG. 2. In FIG. 8, those parts which are the same as those corresponding parts in FIG. 7 are designated by the same reference numerals, and a description thereof will be omitted.

In this modification, the screens S1 through Sn are respectively made of liquid crystal panels S11 through S1n which can switch between transmitting and blocking (diffusing) states in response to voltages applied thereto. In addition, a screen control unit 41 is coupled to the liquid crystal panels S11 through S1n and the projection type displays 31-1 through 31-n. Normally, this screen control unit 41 controls the liquid crystal panels S11 through S1n to be in the transmitting state, and the corresponding projection type displays 31-1 through 31-n to be in the blocking state. In addition, this screen control unit 41 successively controls the liquid crystal panels S11 through S1n to be in the diffusing state, and the corresponding projection type displays 31-1 through 31-n to be in the projecting state.

The display units 11-1 through 11-n are grouped into a group of the display units 11-1 through 11-4, a group of the display units 11-5 through 11-8, . . . , a group of the display units 11-n-7 through 11-n-4, and a group of the display units 11-n-3 through 11-n, and the screen control unit 41 supplies control signals to the liquid crystal panels S11 through S1n and the projection type displays 31-1 through 31-n so that within each of the groups, the liquid crystal panels S11 through S1n are successively controlled to be in the diffusing state and the projection type displays 31-1 through 31-n are successively controlled to be in the projecting state. Therefore, it is possible to minimize the non-projection image which is not projected, and a smooth image display becomes possible.

In this state, the luminance of the transmitted light is different between rays supplied to the main stand 21 by passing through the screens in the transmitting state and rays supplied directly to the main stand 21, even if the liquid crystal panels are in the transmitting state. Hence, in order to prevent this difference in the luminances of the transmitted light, the projection type displays 31-1 through 31-n increases the luminance of the overlapping image portion, that is, the image projected at an angle a in FIG. 8. The luminances of the images are set so that the image directly emitted from the liquid crystal panel and the image transmitted through the liquid crystal panel arranged in front have approximately the same luminance.

Next, a description will be given of an image pickup system which generates the input image.

FIG. 9 is a diagram explaining an image pickup used for the image display system of FIG. 2. The input image is picked up by setting an image input device 51 at a representative point P in the main stand 21 from which the entire field 22 is visible, as shown in FIG. 9. The image input device 51 is made of a CCD camera or the like, and picks up the image in a range (angleβ) shown in FIG. 9 including the part where the display units are arranged in the field 22 and a portion of the background.

FIG. 10 is a diagram explaining a resolving power of an image input device used for the image display system of FIG. 2. The image input device 51 includes a lens 51a and an image pickup element 51b, and it is assumed for the sake of convenience that d denotes a pixel pitch on the image pickup plane of the image pickup element 51b, 1 denotes a back focus length which is an interval of the lens 51a and the image pickup element 51b, and L denotes a distance to the object. In this case, the resolving power D can be described by the following.

$$D = d \cdot (L/1) \quad (3)$$

On the other hand, a resolution DO of the display system can be described by the following formula, where L denotes the distance to the object and θ denotes an angle of resolving power of the human eyes.

$$DO = L \tan\theta \quad (4)$$

In order to make a display which appears natural to the observer, the resolving power D of the image pickup system and the resolving power DO of the eyes must match, that is, the formulas (3) and (4) must be equal to each other.

Accordingly, the following formula must stand:

$$d \cdot (L/1) = L \tan\theta \quad (5)$$

The formula (5) above can be transformed into the following.

$$d/1 = \tan\theta \quad (6)$$

Furthermore, the formula (6) can be described by the following.

$$d = 1\tan\theta \quad (7)$$

Accordingly, if the resolution angle θ of the human eyes is 1 minute and the back focus length 1 of the image input device is 10 mm, it may be seen that the resolving power (pitch) d of the image pickup element should be set to 10×tan(1/60°)=2.9 μm.

Figure 11A:
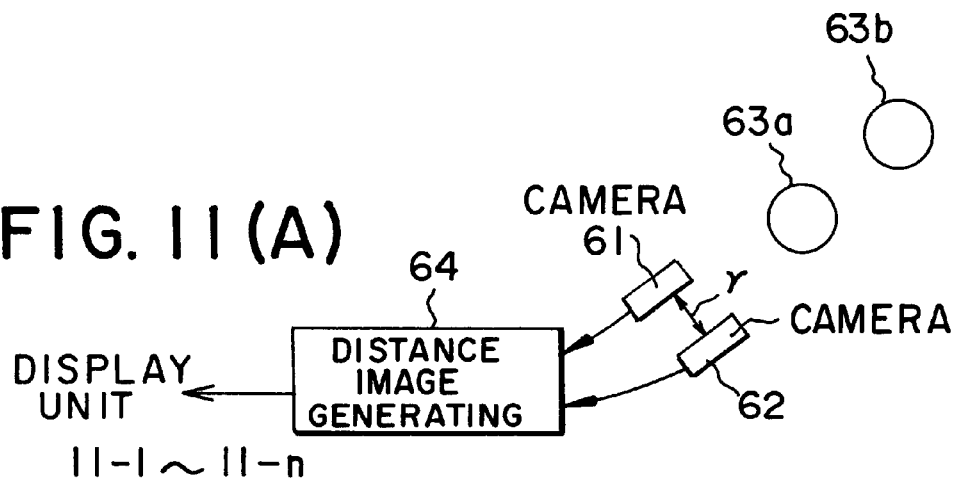
FIG. 11 is a diagram explaining a modified image pickup system used for the image display system of FIG. 2.
Figure 11B:
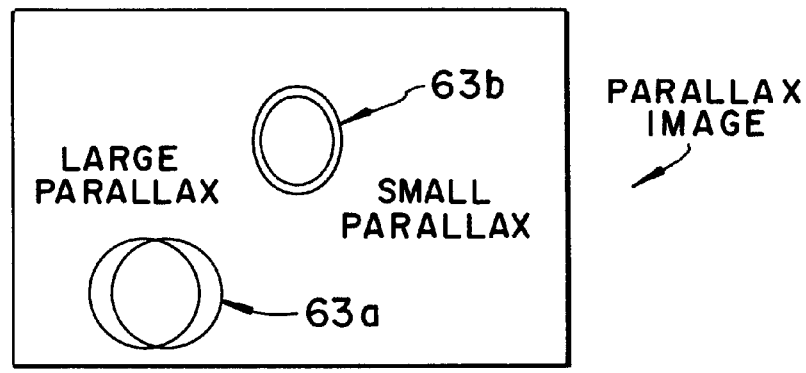
Figure 11C:
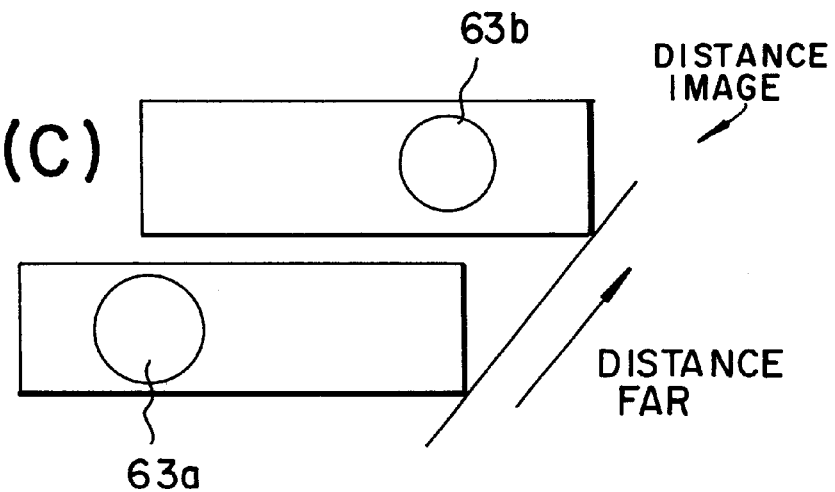

FIG. 11 is a diagram explaining a modified image pickup system used for the image display system of FIG. 2. FIG. 11(A) is a diagram showing a general construction, FIG. 11(B) shows a parallax image, and FIG. 11(C) shows divided images.

In this modification, two image input devices 61 and 62 are arranged at a predetermined interval γ as shown in FIG. 11(A), to pick up objects 63a and 63b. The images picked up by the two image input devices 61 and 62 are supplied to a distance image generating unit 64 (another example of the image dividing means mentioned above). The distance image generating unit 64 is provided in place of the image dividing unit 12, and detects the parallax of the images picked up by the two image input devices 61 and 62. When the two images picked up by the two image input devices 61 and 62 are superimposed, parallax is introduced in the image of the object 63a which is near and the image of the object 63b which is far, between the images of the objects picked up by the two image input devices 61 and 62, as shown in FIG. 11(B). The magnitude of the parallax differs depending on the near and far positions of the objects.

As shown in FIG. 11(B), the parallax is large in the image of the object 63a which is near the image pickup position, and the parallax is small in the image of the object 63b which is far from the image pickup position. The distance image generating unit 64 detects the parallax, and divides the image as shown in FIG. 11(C) by detecting the near and far positions of the objects.

According to this modification, the image is detected from the parallax. For this reason, it is possible to accurately detect the position of the object compared to the case where the input image is simply divided into rectangular images depending solely on the position. As a result, it is possible to distribute the detected images to the corresponding display units 11-1 through 11-n and to display an image which is close to the actual image.

A more detailed description will be given with respect to this modification.

Figure 12:
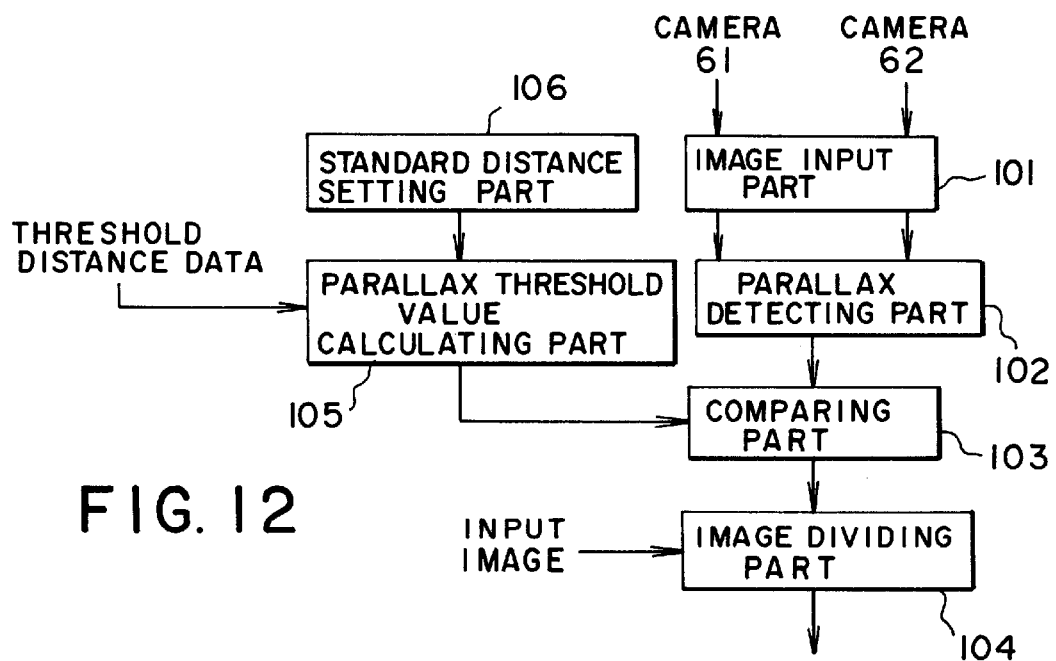
FIG. 12 is a block diagram showing a construction of a distance image generating part corresponding to the image pickup system of FIG. 11.

FIG. 12 is a system block diagram showing a construction of the distance image generating unit 64. The distance image generating unit 64 of this modification includes an image input part 101, a parallax detecting part 102, a comparing part 103, an image dividing part 104, a parallax threshold value calculating part 105, and a standard distance setting part 106. The image input part 101 receives the images from the cameras 61 and 62, and extracts images of the concerned objects. The parallax detecting part 102 calculates the parallax from the images of the concerned objects extracted by the image input part 101. The comparing part 103 compares the parallax calculated by the parallax detecting part 102 and a parallax threshold value which is calculated in advance, and obtains dividing positions. The image dividing part 104 divides the input image depending on the dividing positions of the input image obtained by the comparing part 103. The parallax threshold value calculating part 105 calculates the parallax threshold value which is supplied to the comparing part 103. The standard distance setting part 106 sets a standard distance for use in detecting the parallax by the parallax threshold value calculating part 105.

The image input part 101 inputs the images picked up by the cameras 61 and 62, and extracts the concerned objects such as the players and the ball from the picked up images by carrying out an image extraction process. The concerned objects which are extracted by the image input part 101 are supplied to the parallax detecting part 102. The parallax detecting part 102 detects the parallax, that is, the difference between the positions of the concerned objects which are common to the picked up images of the cameras 61 and 62, and supplies the difference in the positions of the common concerned objects to the comparing part 103.

Figure 13:
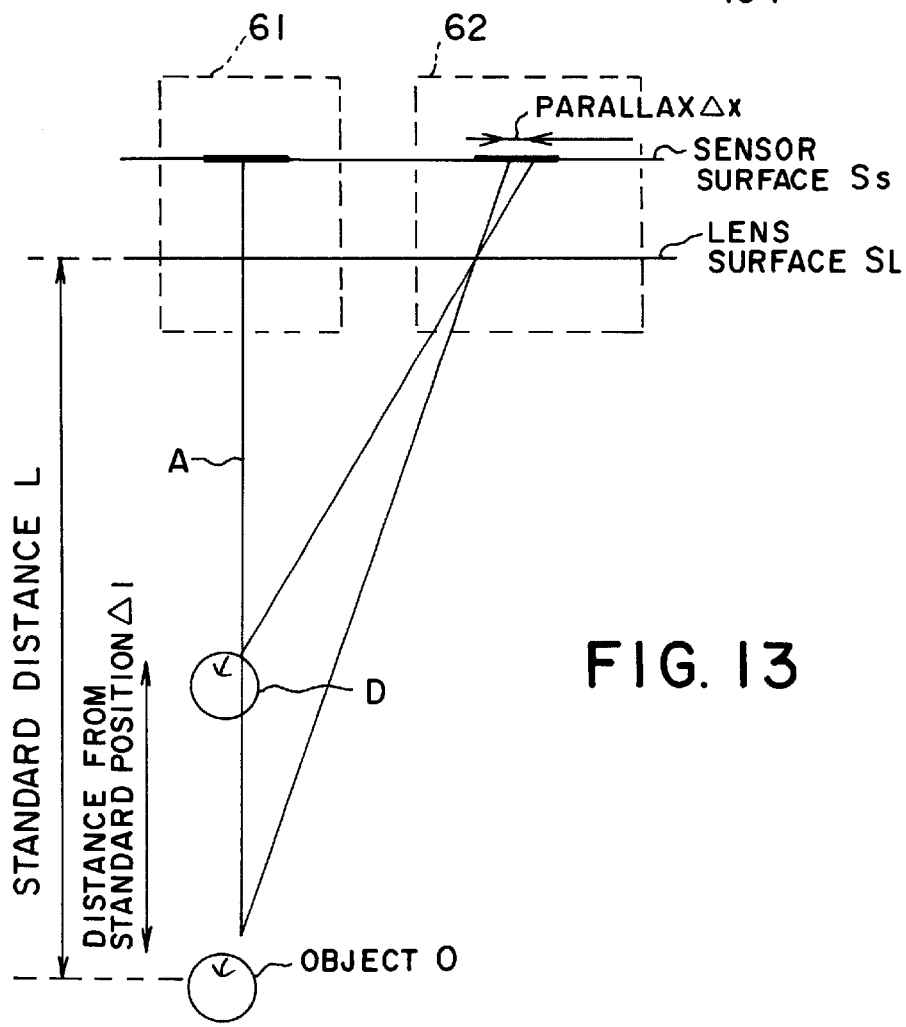
FIG. 13 is a diagram explaining a parallax detecting method corresponding to the image pickup system of FIG. 11.

FIG. 13 is a diagram for explaining a parallax detecting method of the distance image generating unit 64. If a standard distance from a lens surface $S_L$ to an object O is denoted by L and the object O moves a distance ΔL in a direction A along the optical axis of the camera 61, the image of the object O picked up by the camera 62 changes by Δx on a sensor surface $S_s$ compared to the position of the object O located at the standard distance L. This change fix corresponds to the parallax.

If a distance (stereo base) between the cameras 61 and 62 is denoted by d and a magnification ((image size of the object O on the sensor surface $S_s$)/(actual size of the object O)) of the image pickup by the cameras 61 and 62 is denoted by a, the parallax Δx can be described by the following.

$$\Delta x = \alpha d \Delta L / (L - \Delta L) \quad (8)$$

FIG. 14 is a diagram showing a relationship of the parallax with respect to an image pickup distance in the modified image pickup system of FIG. 11. FIG. 14 shows the parallaxes Δx which are obtained at the image pickup distances corresponding to the set up distances of the display screens shown in FIG. 5 when the stereo base d is 20 m, the magnification of the image pickup is 1/200 and the standard distance is 50 m.

In FIG. 14, the parallax Δx of the image displayed on the display screen arranged at the closest position, which is 30 m from the observer, becomes as follows, based on the image pickup results of the cameras 61 and 62 and the formula (8) described above:

$$\Delta x = \{1/200\} \times 20 \times 20\}/(50-20) = 2/3 \approx 0.67$$

In addition, with respect to the set up distance of 32.3 m where the next display screen is arranged, the parallax fix becomes 0.55 by substituting ΔL=(50−32.3)=17.7 to the formula (8). In other words, as a result of the parallax detection in the parallax detecting part 102, it may be judged that the image should be divided so as to display the object O for which the parallax is detected by the parallax detecting part 102 on the display screen which is arranged at the position which is 20 m from the observation position, if the parallax is between 0.67 and 0.55.

Similarly, with respect to the set up distance of 42.16 m where the next display screen is arranged, the parallax Δx becomes 0.19 by substituting ΔL=(50−42.16)=7.84 to the formula (8). In addition, with respect to the set up distance of 47.01 m where the next display screen is arranged, the parallax Δx becomes 0.06 by substituting ΔL=(50−47.01)= 2.99 to the formula (8).

In other words, as a result of the parallax detection in the parallax detecting part 102, it may be judged that the image should be divided so as to display the object O for which the parallax is detected by the parallax detecting part 102 on the display screen which is arranged at the position which is 42.16 m from the observation position, if the parallax is between 0.19 and 0.06.

Furthermore, with respect to the set up distance of 53.16 m where the next display screen is arranged, the parallax Δx becomes −0.06 by substituting ΔL=(50−53.16)=−7.84 to the formula (8), and it is found that the object in the images picked up by the cameras 61 and 62 shifts in a direction opposite to the case where the display screen is arranged at a position having a set up distance of 50 m or less. In addition, with respect to the set up distance of 61.22 m where the next display screen is arranged, the parallax fix becomes −0.18 by substituting ΔL=(50−61.22)=−11.22 to the formula (8).

In other words, as a result of the parallax detection in the parallax detecting part 102, it may be judged that the image should be divided so as to display the object O for which the parallax is detected by the parallax detecting part 102 on the display screen which is arranged at the position which is 53.16 m from the observation position, if the parallax is between −0.06 and −0.18.

The comparing part 103 compares the parallax threshold value which is set in advance depending on the display screen position as shown in FIG. 14 and the parallax detected by the parallax detecting part 102, and determines the display screen which is to display the object the parallax of which is detected by the parallax detecting part 102.

The image dividing part 104 divides the image picked up by the camera 61 or 62 at the positions determined by the comparing part 103, and transmits the divided images.

In addition, the parallax threshold value calculating part 105 calculates and supplies the parallax threshold value which is used as a reference in the comparing part 103 for the comparison with the parallax detected by the parallax detecting part 102.

The standard distance L (for example, 50 m) which makes the parallax zero is supplied from the standard distance setting part 106 to the parallax threshold value calculating part 105. In addition, distance information S such as 30 m, 32.3 m, 35.01 m, . . . , and 112.2 m, which indicate the positions where the display screens are set up as shown in FIG. 5, are also supplied to the parallax threshold value calculating part 105. The parallax threshold value calculating part 105 obtains a moving distance ΔL shown in FIG. 13 from the standard distance L which makes the parallax zero and is obtained from the standard distance setting part 106 and the distance information S which indicates the positions where the display screens are set up as shown in FIG. 5. The moving distance ΔL is obtained from the following:

$$\Delta L = (L - S) \quad (9)$$

Next, the moving distance ΔL which is obtained from the formula (9) and the standard distance L supplied from the standard distance setting part 106 are substituted into the formula (8), so as to obtain and store the parallax fix corresponding to the distance information S which indicates the positions where the display screens are set up as shown in FIG. 5, for every distance S, as shown in FIG. 14.

The stereo base d dependent on the set up states of the cameras 61 and 62 and the image pickup magnification α of the cameras 61 and 62 are prestored in the parallax threshold value calculating part 105. Hence, the parallax threshold value calculating part 105 calculates the formula (9) when the distance information S and the standard distance L are substituted into the formula (9), and the formula (8) is calculated based on the calculation result of the formula (9) so as to calculate the parallax threshold value.

If the parallax of the concerned object O detected by the parallax detecting part 102 falls within the parallax threshold value of 0.67 to 0.55 calculated by the parallax threshold value calculating part 105 as a result of the comparison made in the comparing part 103, the image dividing part 104 divides the input image so as to display the concerned object O on the display screen arranged at the position having the set up distance of 30 m. If the parallax of the concerned object O detected by the parallax detecting part 102 falls within the parallax threshold value of 0.55 to 0.43 calculated by the parallax threshold value calculating part 105, the image dividing part 104 divides the input image so as to display the concerned object O on the display screen arranged at the position having the set up distance of 32.3 m. If the parallax of the concerned object O detected by the parallax detecting part 102 falls within the parallax threshold value of 0.43 to 0.31 calculated by the parallax threshold value calculating part 105, the image dividing part 104 divides the input image so as to display the concerned object O on the display screen arranged at the position having the set up distance of 35.01 m, and the division and display are made similarly thereafter. In addition, if the parallax of the concerned object O detected by the parallax detecting part 102 falls within the parallax threshold value of −0.31 to −0.43 calculated by the parallax threshold value calculating part 105, the image dividing part 104 divides the input image so as to display the concerned object O on the display screen arranged at the position having the set up distance of 87.94 m. Further, if the parallax of the concerned object O detected by the parallax detecting part 102 falls within the parallax threshold value of −0.43 to −0.55 calculated by the parallax threshold value calculating part 105, the image dividing part 104 divides the input image so as to display the concerned object O on the display screen arranged at the position having the set up distance of 112.2 m.

Figure 15:
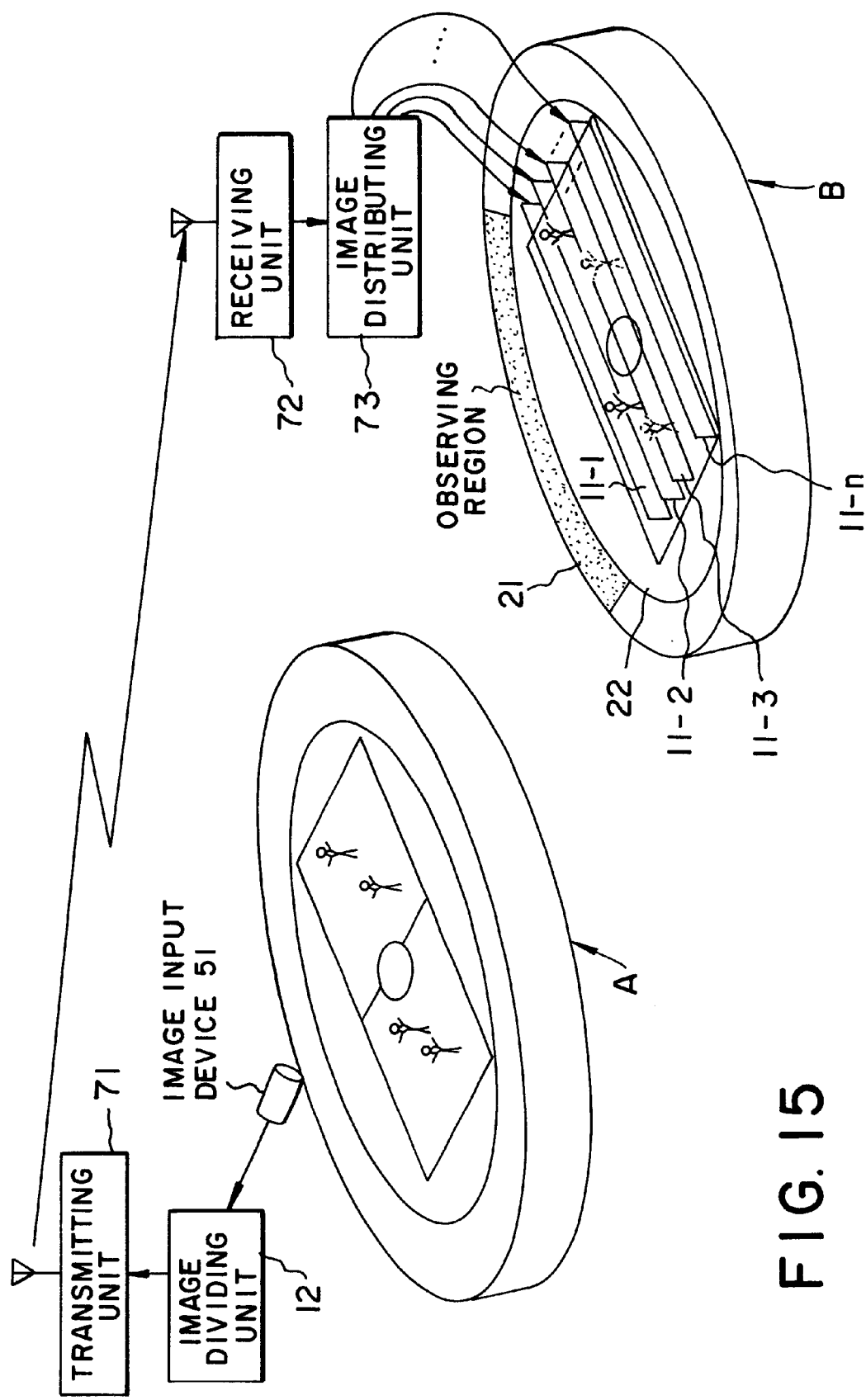
FIG. 15 is a diagram showing a general construction of an application of the preferred embodiment of the present invention.

FIG. 15 is a diagram showing a general construction of an application of the image display system according to the preferred embodiment of the present invention. In FIG. 15, those parts which are the same as those corresponding parts in FIG. 2 are designated by the same reference numerals, and a description thereof will be omitted.

In the application of a preferred embodiment of the present invention, a game that is played in a stadium A is displayed three-dimensionally in another stadium B so that the game can be seen in the other stadium B.

The image input device 51 described above is provided in the stadium A, and picks up the image of the game that is played in the stadium A as shown in FIG. 3(A), for example. The picked up image 13 is supplied to the image dividing unit 12, and is divided into the rectangular images 13-1 through 13-n as shown in FIG. 3(B) to be displayed at the positions corresponding to the plurality of display units 11-1 through 11-n which are arranged in the stadium B.

The plurality of rectangular images 13-1 through 13-n divided in the image dividing unit 12 are supplied to a transmitting unit 71 and are transmitted by, for example, radio transmission. The plurality of rectangular images 13-1 through 13-n transmitted from the transmitting unit 71 are received by a receiving unit 72 provided at the stadium B. The plurality of rectangular images 13-1 through 13-n received by the receiving unit 72 are supplied to an image distributing unit 73.

The image distributing unit 73 distributes the plurality of rectangular images 13-1 through 13-n to the plurality of display units 11-1 through 11-n which are arranged in the field 22 of the stadium 22.

According to this application of the present invention, the game that is actually being played in the stadium A can be seen in the other stadium B as if the game were being played in this other stadium B.

In this embodiment, only the image on the field 22 is displayed. But since the image can only be recognized from the main stand 21, the back (outfield) stand when viewed from the main stand 21 is empty, thereby deteriorating the real life effect. Hence, it is conceivable to provide a large screen in front of the back (outfield) stand and to display the background thereon, so as to produce the real life presence effect.

Figure 16:
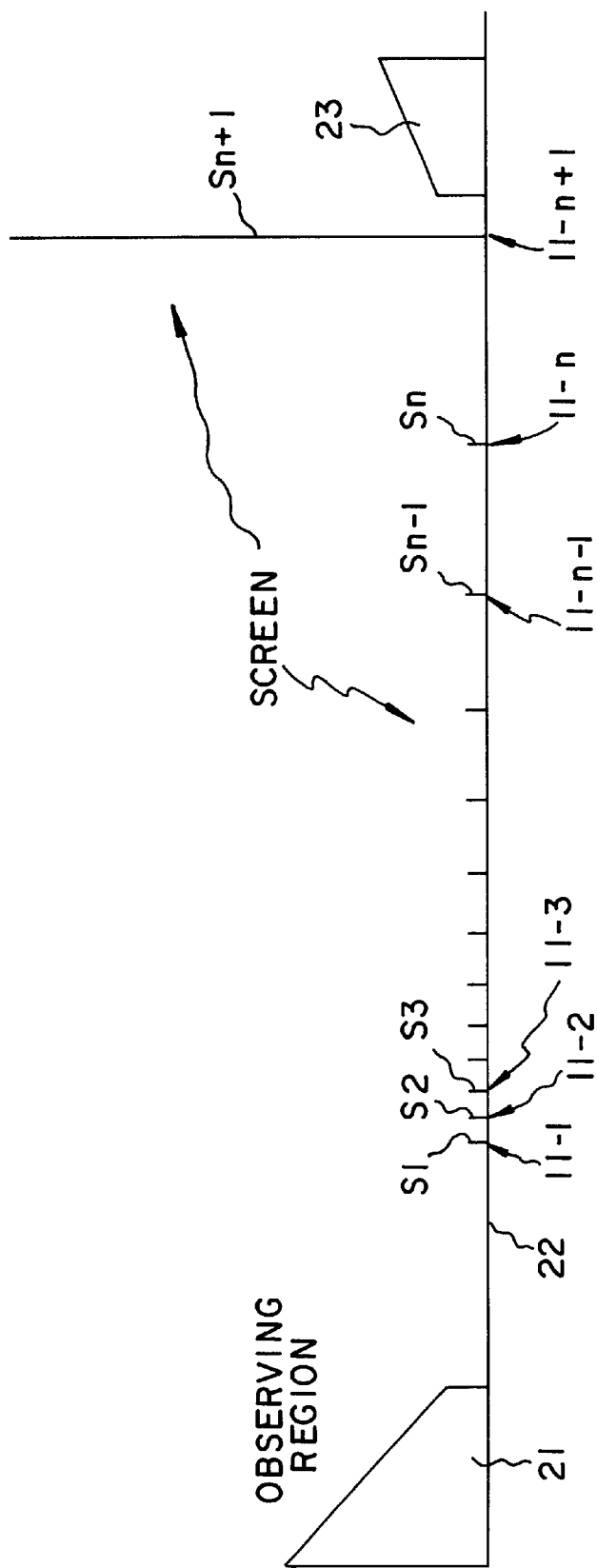
FIG. 16 is a diagram showing a general construction of another preferred embodiment of the present invention.

FIG. 16 is a diagram showing a general construction of an image display system according to another preferred embodiment of the present invention. In FIG. 16, those parts which are the same as those corresponding parts in FIG. 2 are designated by the same reference numerals, and a description thereof will be omitted.

In this preferred embodiment, a display unit 11-n+1 having a screen Sn+1 which covers the back (outfield) stand 23 is arranged behind the display unit 11-n. The display unit 11-n+1 receives the image of the background portion from the image dividing unit 12, and displays the background. According to this embodiment, it is possible to further improve the real life presence effect by providing the display unit 11-n+1 which has the screen Sn+1 for displaying the background in front of the back (outfield) stand 23, so as to display the image of the back (outfield) stand which is the background portion of the field of the stadium A where the actual game is picked up.

With an image display system according to the present invention, three-dimensional images with real life presence may be created on a large scale across a plurality of display means with a relatively simple construction and without cumbersome equipment imposed on viewers. Moreover, the following benefits are achieved with various features of the present invention.

From the input image, the image existing nearby is displayed on the display means arranged near the observer, and the image existing far away is displayed on the display means arranged far away from the observer. For this reason, the observer can recognize the images displayed on the plurality of display means as a three-dimensional image.

The depth perception of the human eyes becomes poorer as the distance from the observation point becomes longer. Hence, adjacent display means of the plurality of display means are set at intervals proportional to the distances from the observation position, so that it is possible to reduce the number of display means without deteriorating the depth perception and to simplify the system structure.

A plurality of display means are set at intervals matching the depth perception of the human eyes, by arranging the plurality of display means at intervals proportional to the squares of the distances from the observation position. For this reason, it is possible to reduce the number of display means without deteriorating the depth perception and to simplify the system structure.

The resolving power of the human eyes becomes poorer as the distance from the observation position becomes longer, and thus, the displayed images do not become unnatural to the human eyes even if the pixel pitches of the display means located far away from the observation position is set coarse. Hence, it is possible to provide a natural display to the observer and to simplify the system structure, by setting the pixel pitches of the plurality of display means proportional to the distances from the observation position.

Since the images projected from the projector are output to diffusing means to be displayed thereon, it is possible to form a large screen using a relatively simple construction, and the system structure can be simplified.

Since the diffusing means includes transmitting and diffusing means which switch between diffusing and transmitting states, and the switch control means successively switches the transmitting and diffusing means to the diffusing state, it is possible for the observer to positively recognize the overlapping image portions even when the displayed images overlap between adjacent diffusing means. As a result, it is possible to display the images with real life presence across the plurality of display means.

It is possible to increase the number of display means which simultaneously assume the diffusing state, by successively switching to the diffusing state within a predetermined number of consecutive display means having display images which do not overlap when the observation is made from the observation position. For this reason, it is possible to reduce the number of images which are not displayed, and to display the images with real life presence across the plurality of display means.

No difference is introduced between the luminance of the image portion overlapping with the other display means and the luminance of the image portion not overlapping with the other display means, because the luminances of the image portions overlapping with the other display means are set higher than the luminances of the image portions which do not overlap. For this reason, it is possible to display images which appear natural to the observer across the plurality of display means.

It is possible to simply obtain the images to be displayed on the plurality of display means by successively dividing the input image into ranges of distances corresponding to the display positions of the plurality of display means at the varying placement intervals between adjacent display means.

The images are detected by first and second image input means, a parallax is detected from the two input images, and the display means for making the display are divided depending on the detected parallax. As a result, it is possible to accurately set the display positions of the images, and to display images which appear natural to the observer across the plurality of display means.

Although preferred embodiments of the present invention have been described, it would be appreciated by those skilled in the art that changes may be made in these embodiments without departing from the principles and spirit of the invention, the scope of which is defined in the claims and their equivalents.

What is claimed is:

1. An image display system, comprising:
 image dividing means for dividing an input image into a plurality of images based on varying distances of portions of the input image from an image pickup position; and
 a plurality of display means, each successively arranged at different distances from an adjacent one of said plurality of display means, for displaying the plurality of images divided in said image dividing means, the plurality of images divided by said image dividing means being displayed on a corresponding display means of said plurality of display means corresponding to the distances from the image pickup position.

2. An image display system as recited in claim 1, wherein adjacent display means of said plurality of display means are successively set at intervals proportional to the distances from the observation position.

3. An image display system as recited in claim 2, wherein the adjacent display means of said plurality of display means are set at the intervals proportional to squares of the distances from the observation position.

4. An image display system as recited in any of claims 1 to 3, wherein said plurality of display means include pixel pitches being set proportional to the distances from the observation position.

5. An image display system as recited in any of claims 1 to 3, wherein said plurality of display means include a projector projecting the plurality of images, and diffusing means for diffusing light output from said projector.

6. An image display system as recited in claim 5, wherein said diffusing means comprises:
   transmitting and diffusing means which can switch said diffusing means between diffusing and transmitting states; and
   switch control means for successively switching said transmitting and diffusing means to the diffusing state.

7. An image display system as recited in claim 6, wherein said switch control means successively switches to the diffusing state a predetermined number of consecutive display means of said plurality of display means having display images which do not overlap when an observation is made from the observation position.

8. An image display system, comprising:
   image dividing means for dividing an input image into a plurality of images based on varying distances of portions of the input image from an image pickup position; and
   a plurality of display means, each successively arranged at different distances from an adjacent one of said plurality of display means, for displaying the plurality of images divided in said image dividing means, the plurality of images divided by said image dividing means being displayed on a corresponding display means of said plurality of display means corresponding to the distances from the image pickup position,
   wherein said plurality of display means include a projector projecting the plurality of images, and diffusing means for diffusing light output from said projector,
   wherein said projector projects the plurality of images with luminances of image portions overlapping portions of adjacent display means of said plurality of display means being set higher than luminance of image portions which do not overlap.

9. An image display system as recited in claim 8, wherein said diffusing means comprises:
   transmitting and diffusing means which can switch said diffusing means between diffusing and transmitting states; and
   switch control means for successively switching said transmitting and diffusing means to the diffusing state
   wherein said projector projects the plurality of images with luminance of image portions overlapping portions of adjacent display means of said plurality of display means beings set higher than luminance of image portions which do not overlap.

10. An image display system as recited in claim 9, wherein said switch control means successively switches to the diffusing state a predetermined number of consecutive display means of said plurality of display means having display images which do not overlap when an observation is made from the observation position.
   wherein said projector projects the plurality of images with luminance of image portions overlapping portions of adjacent display means of said plurality of display means being set higher than luminance of image portions which do not overlap.

11. An image display system as recited in any of claims 1 to 3, wherein said image dividing means divides the input image based on ranges of distances corresponding to display positions of the plurality of display means.

12. An image display system as recited in any of claims 1 to 3, further comprising:
   first image input means for picking up an image;
   second image input means, arranged at a predetermined interval from said first image input means, for picking up the image; and
   parallax detection means for detecting a parallax from the image picked up by at least one of said first image input means and said second image input means,
   wherein said image dividing means divides the input image into the plurality of images based on the parallax detected by said parallax detection means.

13. An image display system, comprising;
   an image dividing device dividing an input image into a plurality of images based on successively longer distances from an image pickup position attributed to portions of the input image; and
   a plurality of display units, each positioned at successively longer distances from an adjacent one of said plurality of display units, the plurality of display units at the respective successively longer distances from the observation point correspondingly displaying the plurality of images at the respective successively longer distances from the image pickup position.

14. An image display system as recited in claim 13, wherein said plurality of display units are positioned at the successively longer distances based on minimum successive distances corresponding to a depth resolving power at each position of said plurality of display units.

15. An image display system, comprising:
   an image dividing device dividing an input image into a plurality of images based on successively longer distances from an image pickup position attributed to portions of the input image; and
   a plurality of display units, each positioned at successively longer distances from an adjacent one of said plurality of display units, the plurality of display units at the respective successively longer distances from the observation point correspondingly displaying the plurality of images at the respective successively longer distances from the image pickup position,
   wherein said plurality of display units are positioned at the successively longer distances based on minimum successive distances corresponding to a depth resolving power at each position of said plurality of display units, the depth resolving power being defied to be $AD^K$, where A is $1.34 \times 10^{-3}$, D is the distance from the observation point to the position for one of the plurality of display units, and K=2.19.

16. An image display system as recited in claim 13, wherein said plurality of display units include successively coarser image resolutions based on the successively longer distances of the plurality of display units.

17. An image display system as recited in claim 13, wherein said plurality of display units include diffusing and transmitting states, and a switching control to switch said plurality of display units between the diffusing and transmitting states, and wherein the switching control successively switches a predetermined number of consecutive display units of said plurality of display units, which do not have overlapping images when viewed from the observation position, to a diffusing state.

18. An image display system, comprising:

an image dividing device dividing an input image into a plurality of images based on successively longer distances from an image pickup position attributed to portions of the input image; and a plurality of display units, each positioned at successively longer distances from an adjacent one of said plurality of display units, the plurality of display units at the respective successively longer distances from the observation point correspondingly displaying the plurality of images at the respective successively longer distances from the image pickup position, wherein said plurality of display units display the plurality of images with luminances of overlapping portions of images across adjacent display units being set higher than luminances of portion of images which do not overlap.

19. An image display system as recited in claim 13, further comprising:

a first image input device for picking up an image;

a second image input device, arranged at a predetermined interval from said first image input means, for picking up the image; and parallax detection means for detecting a parallax from the image picked up by at least one of said first image input means and said second image input means, wherein said image dividing device divides the input image into the plurality of images based on the parallax detected by said parallax detection means.

20. An image display system comprising:

an image dividing unit dividing an input image into a plurality of rectangular images which are elongated in a horizontal direction based on varying distances of portions of the input image from an image pickup position; and a plurality of display units, each successively arranged at different distances from an adjacent one of said plurality of display units, displaying the plurality of images divided in said image dividing unit, the plurality of images divided by said image dividing unit being displayed on a corresponding display unit of said plurality of display units corresponding to the distances from the image pickup position.

21. The image display system as claimed in claim 20, wherein said image dividing unit divides the input image into a plurality of rectangular images having different lengths in a vertical direction depending on the varying distances of the portions of the input image from the image pickup position.

* * * * *